Oct. 10, 1967    J. E. BROOK    3,346,791
RESOLVER CONTROLLED TORQUING SYSTEM
Filed July 15, 1964
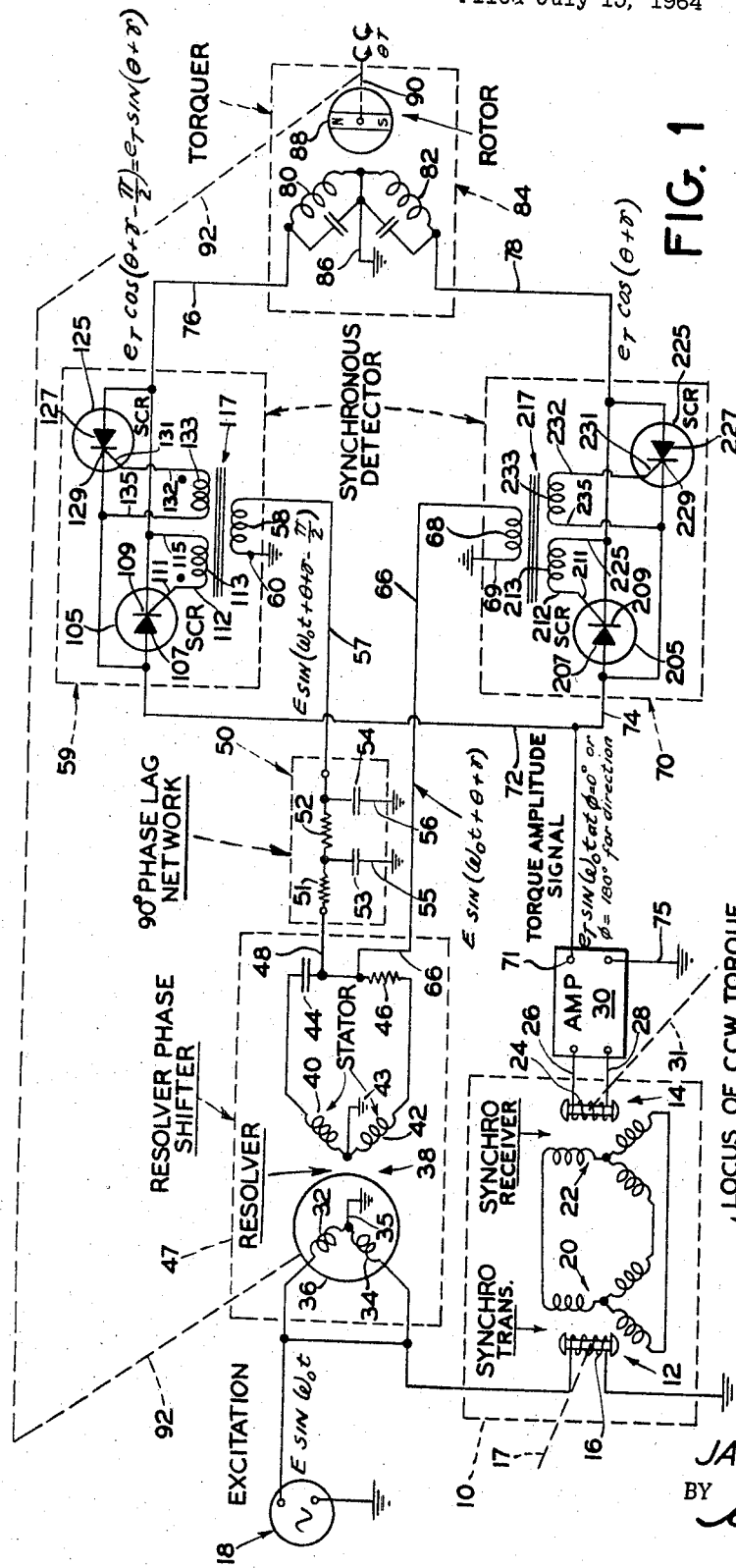
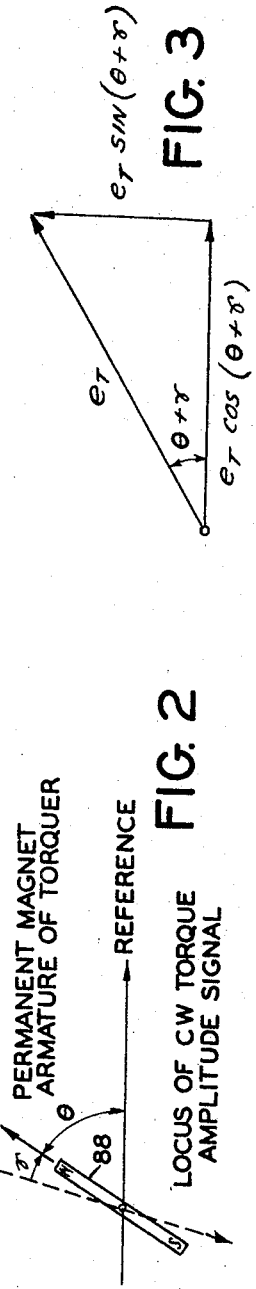
INVENTOR.
JAMES E. BROOK
BY *Herbert L. Davis*
ATTORNEY

United States Patent Office 3,346,791
Patented Oct. 10, 1967

3,346,791
RESOLVER CONTROLLED TORQUING SYSTEM
James E. Brook, Maywood, N.J., assignor to The Bendix Corporation, Teterboro, N.J., a corporation of Delaware
Filed July 15, 1964, Ser. No. 382,896
7 Claims. (Cl. 318—24)

ABSTRACT OF THE DISCLOSURE

A resolver controlled torquing system in which speed-torque control of a direct current torquer motor is effected by utilizing rotor-to-stator angle information provided in the resolver alternating current outputs so as to separately modify in each of a pair of suitable current modifying devices a position controlling error signal to effect the desired result. The error signal is modified in accordance with the angular information in the resolver alternating current output to effect at outputs of such current modifying devices, two direct current torque amplitude signals so proportioned as to excite the orthogonal torquer coils of the direct current torquer motor so as to maintain a resultant field which is always at the power angle of the direct current torquer motor regardless of the angular position of the output shaft thereof so that optimum torque efficiency may be obtained. Thus the resolver having the rotor thereof mechanically coupled to the output shaft of the direct current torquer motor in effect may so modify (or commutate) the two currents exciting the direct current torquer motor in response to the error signal that optimum magnetic torque is produced independently of the angular position of the output shaft of the direct current torquer motor.

---

The invention described herein was made in the performance of work under a NASA contract and is subject to the provisions of the National Aeronautics and Space Act of 1958, Public Law 85–568 (72 Stat. 426; 42 U.S.C. 2451), as amended.

This invention relates to a resolver controlled torquing system and more particularly to a system including a resolver phase shifter to supply rotor-to-stator angle signals so as to provide a commutation effect through the action of a pair of phase discriminators or synchronous detectors for exciting orthogonal control coils of a torquer so as to provide a resultant field which is always at the power angle of the torquer regardless of the angular position thereof so as to effect optimum torque efficiency.

An object of the invention is to provide a simple torquer including a permanent magnetic rotor cooperatively arranged in relation to control windings arranged in spaced quadrature and including means to appropriately excite the control windings so that a resultant magnetic field may be effected acting on the rotor to produce an optimum torque.

Another object of the invention is to provide in cooperative relation with such a torquer a resolver having rotor windings adjustably positioned by the torquer and effective to supply directional signals to the control windings of the torquer to rotate the stator field of the torquer with respect to the permanent magnetic rotor so as to produce a maximum torque regardless of the angular adjustment of the magnetic rotor of the torquer.

Another object of the invention is to provide a resolver phase shifter to supply rotor-to-stator angle information signals applied through a pair of phase discriminators so as to proportion the torque amplitude signal into two D.C. signals for exciting orthogonal control coils of the torquer in which the resultant field is always at the power angle of the torquer regardless of the angular position thereof so that optimum efficiency may be obtained.

Another object of the invention is to provide an improved magnetic actuator which may be utilized in place of a conventional servomotor or torquer and in which the torquer may include a permanent magnet rotor and there is provided a subsystem synthesized around the permanent magnet rotor and including in the subsystem a resolver having rotor windings positioned by the torquer motor so as to control or commutate two exciting coils for the torquer to effect optimum magnetic torque independently of the torquer shaft position.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

In the drawings:

FIGURE 1 is a schematic wiring diagram of a two-pole torquer or motor system embodying the present invention.

FIGURE 2 is a graphical illustration of the magnetic factors in the resolver torquer of the present invention.

FIGURE 3 is a graphical illustration showing the special factors effected by the D.C. signals applied to the torquer control coils which are oriented in space at right angles with each other.

Referring to the system of FIGURE 1, there is illustrated by the numeral 10 a conventional synchro control system including a signal transmitting synchro 12 and a signal receiving synchro 14. The signal transmitting synchro 12 has a rotor winding 16 connected across a source of alternating current 18 and adjustably positioned by a shaft 17 in inductive relation to stator windings 20 which are connected in back-to-back relation with stator windings 22 of the signal receiving synchro 14. The signal receiving synchro 14 has a rotor winding 24 inductively coupled to the stator windings 22 and has output conductors 26 and 28 leading therefrom to the input of an amplifier 30. The rotor winding 24 may be adjustably positioned relative to the stator windings 22 by a shaft 31 so as to provide a null position for the rotor winding 16 of the signal transmitter synchro 12 or the rotor winding 24 may be adjustably positioned by the torquer shown in FIGURE 1 through the shaft 31 so as to follow the adjusted position of the rotor winding 16 of the signal transmitter synchro 12 in a manner well known in the art.

Further, electrically connected across the source of alternating current 18 is a winding 32 and a winding 34 both of which are ground connected at 35 and carried by a rotor element 36 of a resolver 38 of conventional type. The windings 32 and 34 are arranged in space quadrature and in cooperative relation with a stator winding 40 and a stator winding 42, both of which are ground connected at 43. The stator windings 40 and 42 are also arranged in space quadrature and are inductively coupled to the rotor windings 32 and 34 of the resolver 38. A capacitor 44 and a resistor element 46 are serially connected between opposite output terminals of the stator windings 40 and 42 of the resolver 38 so as to constitute a conventional resolver phase shifter 47. An output line 48 leads from a point intermediate the serially connected capacitor 44 and resistor 46 of the resolver phase shifter 47 to an input of a ninety-degree phase (90°) phase lag network 50 of a conventional type including serially connected resistors 51 and 52 and parallel connected capacitors 53 and 54 connected, respectively, to a grounded input 55 and a grounded output 65. An output conductor 57 leads from the resistor 52 and capacitor 54 to a control winding 58 of a synchronous detector 59 of a conventional type. The opposite terminal of the control winding 58 is ground connected at 60 to the grounded output 56 of the ninety-degree phase lag network 50.

The network 50 is effective to lag by ninety-degrees (90°) the phase of the alternating current output signal supplied from the resolver phase shifter 47 to the conductor 48 so that the alternating current applied to the output line 57 from the phase network 50 is of a phase ninety-degrees (90°) displaced in a lagging sense from that of the phase of the alternating current signal applied to the input line 48.

A second output line 66 leads from a point intermediate the capacitor 44 and the resistor 46 of the resolver phase shifter 47 to a control winding 68 of a second synchronous detector 70 also of conventional type. The opposite terminal of the control winding 68 is ground connected at 69 to the grounded output 43 of the resolver 38.

Further, conductors 72 and 74 lead from one output terminal 71 of the amplifier 30 to the input of the synchronous detector 59 and 70, respectively, while the opposite output terminal of the amplifier 30 is connected to ground at 75.

Further, output conductors 76 and 78 from the synchronous detectors 59 and 70, respectively, lead to control field windings 80 and 82 of the torquer 84. The windings 80 and 82 are identical and are connected to the grounded output 75 of the amplifier 30 through a grounded conductor 86. The control field windings 80 and 82 are arranged in space quadrature and in cooperative relation to a permanent magnet rotor 88 connected in driving relation to a torquer output shaft 90. A second shaft 92 drivingly connects the output shaft 90 of the permanent magnet rotor 88 to the rotor 36 of the resolver 38 to angularly position the rotor 36 in synchronism with the angular position of the permanent magnet rotor 88.

The synchronous detector 59 includes between the input line 72 and the output line 76 a silicon controlled rectifier 105 having an anode 107 connected to input line 72 and a cathode 109 connected to the output line 76 with a gating terminal 111 connected to one terminal 112 of a winding 113 having an opposite terminal 115 connected to the output line 76. The control winding 58 is inductively coupled through a transformer 117 to the winding 113 to control the gating terminal 111 of the silicon controlled rectifier 105.

There is further provided in the synchronous detector 59 a second silicon controlled rectifier 125 connected between the input line 72 and the output line 76 and having an anode 127 connected to the output line 76 and a cathode 129 connected to the input line 72 with a gating terminal 131 connected to one terminal 132 of a winding 133 having an opposite terminal connected through conductor 135 to the input line 72. The control winding 58 is inductively coupled through the transformer 117 to the winding 133 to control the gating terminal 131 of the silicon controlled rectifier 125.

The silicon controlled rectifiers 105 and 125 operate similar to a thyratron and pass current from the anode 107 or 127 to the cathodes 109 or 129 thereof after a negative going gating pulse has been applied to the gating terminal 111 or 131, respectively, while the anode supply voltage is positive.

Similarly the synchronous detector 70 includes between the input line 74 and the output line 78 a silicon controlled rectifier 205 having an anode 207 connected to input line 74 and a cathode 209 connected to the output line 78 with a gating terminal 211 connected to one terminal 212 of a winding 213 having an opposite terminal 225 connected to the output line 78. The control winding 68 is inductively coupled through a transformer 217 to the winding 213 to control the gating terminal 211 of the silicon controlled rectifier 205.

There is further provided in the synchronous detector 70 a second silicon controlled rectifier 225 connected between the input line 74 and the output line 78 and having an anode 227 connected to the output line 78 and a cathode 229 connected to the input line 74 with a gating terminal 231 connected to one terminal 232 of a winding 233 having an opposite terminal 235 connected to the input line 74. The control winding 68 is inductively coupled through the transformer 217 to the winding 233 to control the gating terminal 231 of the silicon controlled rectifier 225.

The silicon controlled rectifiers 205 and 225 operate similar to a thyratron and pass current from the anode 207 or 227 to the cathode 209 and 229 thereof after the negative gating pulse has been applied to the gating terminals 211 or 231, respectively, while the anode supply voltage is positive.

The rotor 36 of the resolver 38 is positioned by the torquer rotor 88 by shaft 92. The angular position of shaft 92 is then translated into an equivalent electrical phase angle by the resolver phase shifter 47 and is further modified into two orthogonal components by the phase network 50. The signals at lines 57 and 66 gate the synchronous detectors 59 and 70 so that the component direct currents in the torquer coils 80 and 82 arising from the torque amplitude signal at 72 and 74 will produce a resultant magnetic field in torquer 84 that is so located with respect to torquer rotor 88 as to produce an optimum torque.

*Operation of the resolver controlled torquing system*

The resolver torquing system of the present invention is somewhat analogous to that of the conventional D.C. motor having a permanent magnetic field except that in the present invention the following differences may be noted: (1) the armature 88 of the torquer 84 is in the form of a permanent magnet rather than is the field as in the case of the conventional D.C. motor; (2) the commutator action effected in the conventional D.C. motor is effected in the present invention by the provision of the resolver phase shifter 47 in which the resolver 38 has rotor windings adjustably positioned in synchronism with the rotor 88 of the torquer 84 and coacting with the phase network 50 and a pair of synchronous detectors 59 and 70 to effect energization of the field coil windings 80 and 82 so as to provide a resultant field acting on the permanent magnet rotor 88 so as to produce an optimum torque for varying the angularly adjusted positions of the permanent magnet rotor 88 of the torquer 84; (3) the field of the motor or torquer 84 includes two identical windings 80 and 82 in spaced quadrature fed by the above arrangement rather than providing a commutated armature as in the case of the conventional D.C. motor.

The relation of the magnetic vectors in the torquer 84 effected by the resolver controlled torquing system of the present invention are shown graphically in FIGURE 2.

It will be seen then that for any position of the permanent magnet armature 88 such as the angle $\theta$ of FIGURE 2 a stator field of an amplitude corresponding to the torque amplitude signal and directed at the angle $\gamma$ with respect to the armature 88 is synthesized through the operation of the resolver controlled torquing system of the present invention. The angle $\gamma$ in machine design is a term known as the power angle and is equivalent to the brush block setting of a conventional D.C. motor.

In the system of the subject invention, the resolver phase shifter 47, the phase network 50, and the synchronous detectors 59 and 70 perform the required field synthesis by the method of providing X–Y vector components in the space quadrature torquer coils 80 and 82, as shown graphically in FIGURE 3.

Direction sensed in the system of the present invention is derived from the resolver phase shifter 47 which transforms the space angle $\theta+\gamma$ of FIGURE 2 into an identical phase (electrical) angle. This angle is composed of the independent variable $\theta$ and the constant power angle $\gamma$ which is set into the system by an initial orientation of the resolver stator windings 40 and 42 in relation to the rotor windings 32 and 34 and with respect to the torquer stator windings 80 and 82 and their relation to the permanent magnet rotor 88 (in this respect similar to the setting of the brush block in the conventional D.C. motor).

The resolver phase shifter 47 is so arranged as to generate at the output lines 48 and 66 a signal $$E \sin (\omega_0 t + \theta + \gamma)$$

which as applied at the line 48 is further modified through the ninety-degree (90°) phase lag network 50 of conventional type so as to give an output or second signal $$E \sin \left(\omega_0 t + \theta + \gamma - \frac{\pi}{2}\right)$$

at line 57. These two signals at 57 and 66 are the synchronous signals going into the pair of synchronous detectors 59 and 70 which control the torque amplitude signal. Thus, the two signals applied at the lines 57 and 66 provide the synchronous detector control signals which are applied at the control windings 58 and 68, respectively, of the synchronous detectors 59 and 70 which in turn control the direct current torque amplitude signals applied through the lines 76 and 78 to the control field windings 80 and 82, respectively, of the torquer 84.

The synchronous detectors 59 and 70 give a D.C. output signal proportional to the cosine of the phase angle between the input signal and the signal in synchronism with the angular position of the permanent magnet rotor 88. The signals applied at the inputs 72 and 74 of the synchronous detectors 59 and 70 are accordingly modified by the signals applied to the control windings 58 and 68 of the respective synchronous detectors 59 and 70.

Thus, the output to the line 76 of the synchronous detector 59 becomes $$e_T \cos \left(\theta + \gamma - \frac{\pi}{2}\right)$$

which is identical to $e_T \sin (\theta + \gamma)$ and the output at the line 78 of the synchronous detector 70 becomes $e_T \cos (\theta + \gamma)$.

The aforenoted D.C. signals applied at the output lines 76 and 78, respectively, are then applied to the control field windings 80 and 82, respectively, of the torquer or motor 84, which control windings are oriented in space at right angles to each other so that the space vectors illustrated graphically in FIGURE 3 are obtained.

The resulting magnetic vector of amplitude $e_T$ and direction $(\theta + \gamma)$ is that which was sought in the synthesis provided by the resolver controlled torquing system of the present invention. Hence, it will be seen that for any position $\theta$ of the permanent magnet armature 88, a stator field of the strength $e_T$ will always be applied at the power angle with respect to the permanent magnet armature 88.

The arrangement of the system of FIGURE 1 is such then that upon the rotor winding 16 being positioned in the synchro transmitter 12 in a balanced relation to the rotor winding 24 in the synchro receiver 14 a null signal will be applied across the output 71–75 of the amplifier 30 and there will be no torque applied by the control field windings 80 and 82 of the torquer or motor 84.

However, upon the rotor winding 16 being adjusted to an out of balance relationship in the synchro 12 to that of the rotor winding 24 in the synchro 14, a signal will be applied across the output 71–75 of the amplifier 30 and through lines 72 and 74 to the input of the synchronous detectors 59 and 70 of a phase dependent upon the sense of the out of balance relationship of the windings 16 and 24.

The torque amplitude signal applied then across the output 71–75 of the amplifier 30 will be modified by the signals applied to the control windings 58 and 68 of the synchronous detectors 59 and 70 which are dependent upon the position of the rotor windings 32 and 34 relative to the stator windings 40 and 42 of the resolver 38 and which have been oriented, as heretofore explained, with respect to the torquer stator windings 80 and 82 and their relation to the permanent magnet rotor 88.

The thus modified signals applied to lines 76 and 78 will produce two direct current components in torquer coils 80 and 82 which in turn will produce a resultant magnetic vector that will interact with the permanent magnet torquer rotor 88 to generate an optimum torque. In the system of the present invention, the torque acting on rotor 88 will always be maximum regardless of the angular position or velocity of the rotor 88.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. The combination comprising a torquer including a magnetic rotor and stator field windings arranged in cooperative relation to the magnetic rotor to apply a torque to the rotor in opposite senses, means to generate an error signal to cause excitation of said field windings in such a manner as to effect the sense of the torque applied to the magnetic rotor, means operable in synchronism with angular movement of the magnetic rotor to supply rotor-to-stator angle signals, a pair of current modifying devices operatively connected to said last mentioned means and effective to modify said error signal for controlling excitation of said field windings so as to effect a magnetic field acting on the magnetic rotor to produce an optimum torque at varying angular adjusted positions of the rotor.

2. The combination defined by claim 1 in which said means operable in synchronism with angular movement of the magnetic rotor includes a resolver phase shifter to supply the rotor-to-stator angle signals to said pair of current modifying devices for controlling the excitation of said field windings.

3. The combination defined by claim 1 in which said means operable in synchronism with angular movement of the magnetic rotor includes a resolver having rotor windings and stator windings inductively coupled thereto, means operatively connecting the magnetic rotor to the resolver rotor so as to adjustably position the rotor windings of the resolver relative to the stator windings thereof, and the resolver being thereby effective to supply rotor-to-stator signals to said pair of current modifying devices for modifying the error signals so as to effect directional output signals to the field windings of the torque to rotate the magnetic field of the torquer with respect to the magnetic rotor in such a manner as to effect maximum torque at varying adjusted angular positions of the magnetic rotor.

4. The combination comprising an electromagnetic motor means including a magnetic rotor and a pair of field windings arranged in cooperative relation to the magnetic rotor to apply a torque to the rotor, first means for applying an error signal to each of the field windings for effecting a magnetic field applying a torque to the rotor, second means operable in synchronism with angular movement of the magnetic rotor to supply rotor-to-stator angle signals, and third means responsive to said rotor-to-stator angle signals for controlling the error signal applied by the first means in such a manner as to effect an angular adjustment of the magnetic field relative to the magnetic rotor in a sense to apply a maximum torque at varying angular adjusted positions of the rotor.

5. The combination comprising an electromagnetic torquing means including a magnetic rotor and a pair of field windings arranged in cooperative relation to the magnetic rotor to apply a torque to the rotor in opposite senses, means for generating an error signal to control the sense of the torque applied to the magnetic rotor, a first electrical network for applying the signal from the error signal generating means to one of said field windings, said first electrical network including means for controlling the error signal applied through the first electrical network to said one field winding, a second electrical network for applying the signal from the error signal generating means to the other of said field windings, said second electrical network including means for controlling the error signal applied through the second electrical network to said other field winding, a resolver phase shifter operable in synchronism with angular movement of the magnetic rotor for generating signals varying with the angular relationship of the magnetic rotor to the pair of field windings, means for applying a signal generated by the resolver phase shifter to the control means for the first electrical network, other means including a phase lag network for applying a signal generated by the resolver phase shifter to the control means for the second electrical network and which signal lags in phase the signal applied to the control means for the first electrical network, the signals applied to the control means for the first and second networks modifying the error signals applied therethrough to the pair of field windings in such a manner as to effect an adjustment of the magnetic field relative to the magnetic rotor in a sense to apply a maximum torque at varying angular adjusted positions of the magnetic rotor under the error signals applied to the field windings.

6. The combination comprising an electromagnetic torquing means including a magnetic rotor and a pair of field windings arranged in cooperative relation to the magnetic rotor to apply a torque to the rotor in opposite senses, means for generating an error signal to control the sense of the torque applied to the magnetic rotor, a first electrical network for applying the signal from the error signal generating means to one of said field windings, said first electrical network including a silicon controlled rectifier means for controlling the error signal applied through the first electrical network to said one field winding, a second electrical network for applying the signal from the error signal generating means to the other of said field windings, said second electrical network including a silicon controlled rectifier means for controlling the error signal applied through the second electrical network to said other field winding, a resolver phase shifter including a resolver having a rotor, a first pair of windings carried by the rotor, a second pair of windings inductively coupled to the first pair of windings, means for angularly adjusting the rotor of the resolver in synchronism with angular movement of the magnetic rotor of the electromagnetic torquing means so as to cause said resolver phase shifter to generate signals shifting in phase with the angular relationship of the magnetic rotor to the pair of field windings of the electromagnetic torquing means, means for applying a signal generated by the resolver phase shifter to the control means for the first electrical network, other means including a phase leg network for applying a signal generated by the resolver phase shifter to the control means for the second electrical network and which signal lags in phase the signal applied to the control means for the first electrical network, the signals applied to the control means for the first and second networks modifying the error signals applied therethrough to the pair of field windings in such a manner as to effect an adjustment of the magnetic field relative to the magnetic rotor in a sense to apply a maximum torque at varying angular adjusted positions of the magnetic rotor under the error signals applied to the field windings.

7. A torquing control system comprising a torquer including a permanent magnet rotor and orthogonal control coils for applying a torque to the permanent magnet rotor in opposite senses, the permanent magnet rotor being angularly positioned relative to the control coils, means for applying error signals, a resolver having a rotor coupled to the rotor of the torquer and angularly positioned thereby, synchronous detector means for modifying the error signals in one sense in accordance with the sine of an angular position of the resolver rotor and in another sense in accordance with the cosine of the angular position of the resolver rotor, and means for applying the modified error signals to the orthogonal control coils so as to provide a resultant field relative to the permanent magnet rotor which is at the power angle of the torquer regardless of the angular position of the permanent magnet rotor relative to the orthogonal control coils so as to effect optimum torque efficiency.

No references cited.

BENJAMIN DOBECK, *Primary Examiner.*